UNITED STATES PATENT OFFICE 2,565,195

PROCESS FOR THE PREPARATION OF METHYL AND METHYLENE SULFUR COMPOUNDS

Richmond T. Bell, Grays Lake, Ill., assignor to The Pure Oil Company, Chicago, Ill., a corporation of Ohio No Drawing. Application June 24, 1949, Serial No. 101,252

17 Claims. (Cl. 260—609)

This invention relates to a method for the production of methyl sulfur compounds and methylene sulfur compounds. More particularly, it relates to a method for reducing carbon disulfide to methyl mercaptan, methyl sulfide and methylene sulfur compounds, such as methylene dithiol, thioformaldehyde, and simple polymers of the methylene nucleus and sulfur.

In the organic chemistry of sulfur, it is possible to convert hydrocarbons, such as methane, ethane and propane as they occur, for example in natural gas, to carbon disulfide by reaction thereof with sulfur or hydrogen sulfide in the presence of an appropriate catalyst as described, for example, in United States Patent 2,330,934, dated October 5, 1943, Carlisle M. Thacker. For a properly balanced industrial operation, the process should possess flexibility, because it may be desirable to obtain one or another of the sulfur derivatives to the substantial exclusion of the others. That is, under certain conditions, carbon disulfide may be the desired product, and for many other purposes, a mercaptan may be the desired one. There is substantial industrial demand for methyl mercaptan and, because the conversion of light hydrocarbons to methyl mercaptan is a difficult operation, various means for producing the compound are needed. Thus, it is not a difficult matter in the present development of the art to convert hydrocarbons to carbon disulfide, whereas the conversion of hydrocarbons to methyl mercaptan is still subject to considerable difficulty.

Accordingly, it is a fundamental object of the instant invention to provide a method for converting carbon disulfide to simple methane derivatives, such as methyl mercaptan, dimethyl sulfide, methylene sulfur compounds and the like.

It is a second object of the invention to provide a novel method of reducing carbon disulfide to sulfur derivatives of methane.

It is another object of the invention to provide a liquid or vapor phase process for the reduction of carbon disulfide at a relatively low temperature.

Other objects and advantages of the invention will in part be obvious and in part appear hereinafter.

The invention, accordingly, comprises a process for preparing methyl and methylene sulfur compounds embodying the discovery that carbon disulfide can be reduced at relatively low temperatures, in the range from ambient temperatures to about 400° C., with hydrogen or gases containing free hydrogen in the presence of Friedel-Crafts catalysts which are anhydrous halides, for example, chlorides or bromides, of such metals as aluminum, iron, antimony, columbium, cobalt, zirconium, gallium, tin, beryllium, tungsten, tantalum, titanium, copper and bismuth, and boron trifluoride and its mixtures or compounds with hydrogen fluoride and phosphorus trifluoride, the catalyst being used alone or in conjunction with anhydrous hydrogen halide. The hydrogen halide may be added with the catalyst or may be created in situ by charging a small amount of water with the reactants, thereby hydrolyzing a portion of the metallic halide used as the catalyst. In general, the effective metal halides may be used as such or may be used supported on a carrier such as activated alumina or bauxite, activated carbon, silica gel, kieselguhr, fuller's or infusorial earth, asbestos, or pumice, or may be used as pellets of fused mixtures with other halides.

Thus, the invention contemplates a vapor or liquid phase process involving reaction in a chamber into which carbon disulfide and hydrogen are fed, where the reactant mixture contacts a catalyst of the class described. By appropriate regulation of the catalyst composition and amount, ratio of reactants, pressure, temperature, and time of contact, a reaction is induced which is predominantly reduction of the carbon disulfide to methyl mercaptan and dimethyl sulfide with some incidental production of other derivatives of the material. In general, operation in the portion of the stated temperature range from about 100° to 350° C. is preferable, but when the temperature of operation approaches 350° to 400° C., an altered physical form of the catalyst which can be retained in the reaction zone at that temperature is indicated. That is, the active metal halide fused with an active or inactive different metal halide, for example, pellets of aluminum chloride fused with sodium chloride would be used in the upper portion of the operative temperature range at atmospheric pressure to circumvent loss of the catalyst through vaporization thereof.

Also, for operation at atmospheric pressure and elevated temperatures, a carrier may be impregnated with a molten mixture of catalysts and, upon cooling, the resulting impregnated carrier used as the catalyst. In general, for vapor phase operation a solid catalyst is preferred. However, operation with liquid catalyst, as exemplified by a fused mixture in the molten or liquid state, can be carried out by passing the reactant gases, preferably under pressure, through a contactor in which they are intimately mixed by agitation with the liquid melt, or by bubbling the reactant mixture through the melt. With such vapor phase operation using a liquid catalyst, temperatures of around 400° C. may be employed depending upon the melting point of the fusion mixture chosen and upon the vapor pressure characteristics of the liquid melt with increase in temperature above the melting point.

Pellets of fused mixtures are in general most useful at temperatures of 170° to 400° C. under atmospheric pressure or pressure to about 500 pounds per square inch, but may be used down to temperatures as low as 50° to 60° C. Preferred examples of fused mixtures are as follows:

$AlCl_3$—$CuCl$, $AlCl_3$—$CoCl_2$, $AlCl_3$—$FeCl_2$, $AlCl_3$—$MnCl_2$, $AlCl_3$—$SnCl_2$, $AlBr_3$—$ZnBr_2$, $AlBr_3$—$FeBr_2$, and $AlBr_3$—$SnBr_2$. Other examples of useful fused mixtures are $AlBr_3$—$AgBr$, $AlBr_3$—$NaBr$, $AlBr_3$—$KBr$, $AlBr_3$—$NH_4Br$, $AlBr_3$—$MgBr$, $AlBr_3$—$CdBr_2$, $AlBr_3$—$PBr_3$, $AlBr_3$—$BiBr_3$, $AlCl_3$—$NaCl$, $AlCl_3$—$KCl$, $AlCl_3$—$NH_4Cl$, $AlCl_3$—$AgCl$, $AlCl_3$—$SbCl_3$ and $SbCl_3$—$NH_4Cl$. The foregoing partial list includes mixtures with melting points covering a range of about 50° C. to 400° C., the melting points of preferred combinations covering a range of approximately 100° to 300° C. It is clear that the wide variety in fusion components and their concentrations gives extensive latitude for choice of catalyst with respect to its melting temperature. The foregoing considerations on the range of greatest utility for pellets of fused mixtures apply as well to carriers impregnated with the fused mixtures.

For vapor phase operation in the lower portion of the stated temperature range, temperatures of about 60° to 170° C., at atmospheric pressure, or 60° to 250° C. at pressures from atmospheric to about 500 pounds per square inch, an activated alumina, bauxite, carbon, silica gel, or fuller's earth impregnated with $AlCl_3$ is a preferred form of catalyst.

In general, for liquid phase operation a liquid catalyst, such as a melt of aluminum chloride and antimony chloride, or a finely-divided solid catalyst, such as aluminum chloride alone, is preferred for achieving the needed intimate contact between the liquid reactant and the catalyst. With aluminum chloride alone, reaction temperatures to 160° C. may be employed without serious loss of catalyst if pressures sufficient to maintain a liquid phase are exerted. In general, it is preferred to carry out liquid phase operation at temperatures below about 160° C. as the maximum.

Thus, it will appear that the catalyst to be used for a given process is chosen to match the operation and conditions on the basis of its physical characteristics and activity. In most instances, anhydrous aluminum bromide or chloride would be preferred as the principal active component.

In the preparation of the metal halide catalyst, promoters may be used with the catalyst, the promoters consisting of finely-divided metals, metal mixtures, or alloys, preferably selected from the class of metals which form halides useful as catalysts in the process, such as, copper, iron, aluminum, zinc, tin, gallium, beryllium, magnesium, cobalt, nickel, chromium, tungsten, molybdenum, and bismuth. To prepare such catalyst, a metal may be precipitated first on a carrier as hydroxide, oxide or the like from a solution of the metal salt, with subsequent reduction of the oxide to the metal, followed by dehydration at elevated temperatures. The thus treated carrier may then be impregnated with certain of the metal halides mentioned by volatilization of the halide and immersion of the prepared carrier in the atmosphere of the metal halide vapor to effect a condensation of the halide and impregnation of the catalyst. Where fused pellets are to be used, the powdered metal mixture or alloy may be incorporated into the fused mixture during the melting to insure even distribution of the components throughout the pellets when they have cooled. In liquid phase operation where the active halide is used in an easily dispersed form, the finely-divided metal or alloy may be charged to the contactor with the active halide and adequate agitation will mix and disperse both catalyst components through the liquid phase. When a melt of mixed halides is used in liquid phase operation, the metal promoter is dispersed through the melt by the means used to agitate reactants and catalyst.

If desired, variations in the preparation of the metal-promoted active halide catalysts can be substituted. For example, the carrier can be impregnated with salts of the desired metals which decompose upon heating to form the metal oxide, which may be subsequently reduced. Also, the carrier may be impregnated by immersing and agitating it in a slurry of insoluble salt of the desired metal while evaporating the liquid medium. In this procedure, a metal sulfide in water, alcohols, etc., with subsequent decomposition and/or reduction of the salt to the metal can be used. Impregnation of the carrier with the metal halide follows the treatment to impregnate it with metal.

A test of the process extending over about 4 hours carried out at 100 pounds per square inch gauge and 75° C., where hydrogen was passed into a vessel containing liquid carbon disulfide and anhydrous aluminum chloride as a catalyst in suspension therein, in molar ratio of 6:1, the pressure in the vessel being maintained constant by automatic admission of hydrogen over the period of the test, resulted in the production of substantial quantities of hydrogen sulfide and corresponding amounts of methanethiol and dimethyl thioether, the conversions to these two products being in approximately 2:1 ratio. The principal reactions occurring in the process as carried out in the test were as follows:

(1) $\quad CS_2 + 3H_2 \rightleftarrows CH_3SH + H_2S$ (2) $\quad 2CS_2 + 6H_2 \rightleftarrows (CH_3)_2S + 3H_2S$ Longer contact times also tend to produce a higher ratio of methyl sulfide according to the secondary reaction:

$$2CH_3SH \rightleftarrows (CH_3)_2S + H_2S$$

Other reactions which may occur to a minor extent varying with conditions are as follows:

(1)    (a) $\quad CS_2 + 2H_2 \rightleftarrows HCHS + H_2S$
                       Thioformaldehyde

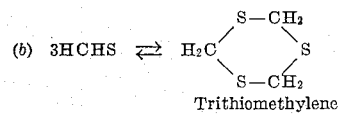
Trithiomethylene (2) $\quad CS_2 + 2H_2 \rightleftarrows H_2C(SH)_2$
                   Methylene dithiol (3) $\quad 2CS_2 + 6H_2 \rightleftarrows C_2H_4 + 4H_2S$ (4) $\quad CS_2 + 4H_2 \rightleftarrows CH_4 + 2H_2S$ It will be observed that a fundamental product of the reduction process is hydrogen sulfide, but its separation from the products is readily accomplished by any one or combination of several means such as stabilization, fractionation, or absorption. The hydrogen sulfide itself can be converted to elementary sulfur and used in an auxiliary process for reaction with hydrocarbons to form additional carbon disulfide in accordance with known processes for converting hydrocarbons to carbon disulfide. An alternative expedient is to conduct the hydrogen sulfide to an auxiliary catalytic process where methanol and hydrogen sulfide are reacted at temperatures of 360° to 430° C. in the presence of metallic oxide dehydration catalysts, such as thoria, zirconia, tungsten oxides, molybdenum oxides, vanadium oxides, zinc oxide, titanium oxide, and cadmium oxide, to produce good yields of more methanethiol and dimethyl thioether.

Theoretical considerations indicate that the following side reactions involving methylene dithiol also can occur:

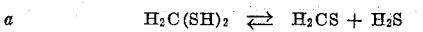
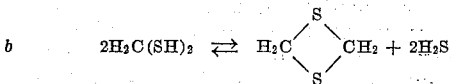
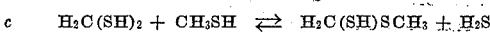
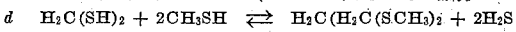
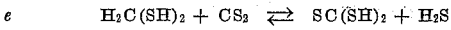

Methyl mercaptan and carbon disulfide also can react in accordance with the following equation:

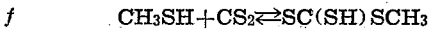

Although the reactions of thio-compounds as suggested by the above analysis of the possibilities indicates considerable complexity in the products, when the process is carried out with active metal halide catalysts as specified herein with proper selection of conditions and control of variables, the product complexity is greatly reduced and substantial yields of methyl mercaptan and dimethyl sulfide are obtained.

The several methods of carrying out the reaction are relatively simple, but vapor phase operation with a bed of solid catalyst is in general advantageous for ease in control of conditions, and recovery and separation of products. For the most efficient operations to secure methanethiol and dimethyl thioether, the reaction is conducted at temperatures in the range of 100° C. to 300° C., space velocities of 50 to 500, with the stoichiometrically necessary amount or a slight excess of hydrogen, and at pressures from atmospheric to 500 pounds per square inch, depending on the temperature. Superatmospheric pressure is advantageous principally for reducing the extent of cooling required for the recovery of products. For a given temperature in vapor phase operation, the pressure employed may be set at any level below a pressure which would cause liquefaction in the process, the choice of pressure being governed largely by the economics of the operation and degree of refrigeration available for recovery and separation of products. When methanethiol is the principal objective, the reaction is best conducted in the range of one to two atmospheres pressure, but higher pressures may be used in the recovery and separation sections following the reaction section if desired in order to modify cooling requirements.

For example, when the process is carried out in vapor phase at atmospheric pressure with a supported catalyst, comprising activated alumina impregnated with metallic iron and about 15 per cent of anhydrous aluminum chloride, at temperatures between 100° and 160° C. and space velocities between 50 and 500, conversions of carbon disulfide of about 5 to 50 per cent are obtained with conversions to methanethiol constituting 2 to 4 times the conversion to dimethyl thioether. Conversion of carbon disulfide to other organic sulfur compounds and methane occurs in the range of from less than 1 per cent to around 4 per cent. Under most combinations of temperature, pressure and space velocity conditions included in the above ranges, conversions to methanethiol are about 3 times the accompanying conversions to dimethyl thioether.

In another example of vapor phase operation, when the process is carried out at higher temperatures in the range of 175° to 275° C., at space velocities in the range from 50 to 500 with a fused catalyst, such as $AlCl_3$—$CuCl$ mixture containing finely-divided copper, carbon disulfide conversions of about 20 to 80 per cent are secured, with conversions to methanethiol again being 2 to 4 times the accompanying conversions to dimethyl thioether. Generally the ratio of the conversion to methanethiol to the conversion to dimethyl thioether is about 3 under most conditions within the specified ranges of temperature and space velocity at substantially atmospheric pressure. The catalyst mentioned has a melting point of about 290° C. for the composition containing 62 mol per cent cuprous chloride and 38 mol per cent aluminum chloride and includes about 10 per cent of finely-divided copper incorporated therein.

As is well-known, exclusive of other considerations, superatmospheric pressure is usually considered advantageous from an economic viewpoint because of increased throughput for a given size of equipment. In the present synthesis, however, elevated pressures tend to favor formation of dimethyl thioether, and therefore, when methanethiol is desired as the primary product, pressures beyond those where a substantial decrease in the ratio of methanethiol conversion to dimethyl thioether conversion is observed should not be used. If dimethyl thioether should be desired as the primary product, pressures to decrease the ratio of methanethiol/dimethyl thioether are advantageous, but even then pressures greater than about 500 pounds per square inch are not desirable, because superatmospheric pressures also tend to favor formation of methane. In general, then, for production of methanethiol, the process is preferably carried out at atmospheric pressure or at moderate superatmospheric pressures up to about two atmospheres.

For purposes of recovery, superatmospheric pressures may be advantageous in some locations to decrease the degree of cooling required for condensation and fractionation of the effluent from the reactor. Therefore, as a variation in the manner in which the process is conducted, the reaction portion of the process may be carried out at atmospheric or moderately elevated pressures, and the product recovery portion of the process may be carried out at higher pressures sufficient to use available coolants of higher temperatures.

In a liquid phase operation constituting a test of the process, 89.3 grams of anhydrous aluminum chloride and 41.6 grams of copper powder were charged to the contactor as the catalyst. Following the procedure outlined, 304.5 grams of carbon disulfide was then charged and the reaction carried out at 100 pounds per square inch gauge and 100° C. for a period of 4 hours. The carbon disulfide was converted principally to methanethiol and dimethyl thioether, in a conversion ratio of about 2:1, in amounts up to about 35 per cent of the theoretical.

The apparatus for carrying out the process in the vapor phase is substantially a conventional catalytic reactor of the type used in hydrocarbon conversion reactions. In the reactor, which may be a fixed or moving bed type of catalytic reactor common in the petroleum art, the catalyst will be maintained in solid form, and the vapors are contacted therewith, the time of contact being regulated by adjustment of the space velocity of the reactant vapors.

In general, recovery and separation is best and preferably accomplished by a series of partial condensations followed by fractionation of the partial condensates. For example, at atmospheric pressure and with space velocities of 50 to 500, satisfactory recovery and initial separation is accomplished by passing effluent reactor vapors first into a receiver or reboiler, maintained at 10° to 25° C., connected to a condenser cooled to −35° to −45° C. This unit effects a major separation of unconverted carbon disulfide, and of a portion of the dimethyl thioether formed, from methanethiol, hydrogen sulfide, and unconverted hydrogen. Vapors from this unit, comprising principally methanethiol, hydrogen and hydrogen sulfide, then pass into a condenser-receiver maintained at −60° to −70° C. where practically all methanethiol is condensed, uncondensed hydrogen sulfide and hydrogen passing on out as exit gas. Primary and secondary recovery sections usually consist of two or more of the units described in series. Primary condensates are led to a low temperature fractional distillation column where unconverted carbon disulfide is separated from dimethyl thioether and any small amounts of methanethiol, and is recycled to the process. Secondary condensates are led to a stabilizer where, by stabilizing the product to a temperature of about 0° C., they are substantially freed of hydrogen sulfide, and thence to a low temperature fractional distillation unit where the methanethiol is separated from dimethyl thioether and any small amounts of unconverted carbon disulfide. As seen, because of the high volatility of reactants and products, at atmospheric pressure a high degree of refrigeration is required for recovery and separation by means of fractional condensation followed by fractional distillation, but as mentioned, the degree of refrigeration can be modified by employing superatmospheric pressure for the recovery and separation section, or for the entire unit including reaction and charge sections. Basic variations in methods for recovery and separation as described in the two ensuing paragraphs are possible, but in general they are not as effective and satisfactory as the foregoing method.

The recovery of the product can be carried out in conjunction with a chemical absorption operation, for the product gas obtained from the reactor can be scrubbed with certain alkaline solutions, such as a sodium carbonate solution, to remove hydrogen sulfide therefrom before passing the mixture of methyl mercaptan and methyl sulfide to the condensate recovery system. This procedure has some disadvantages in that relatively large volumes of solution are required. Also, with scrubbing at room temperature, subsequent stripping of the solution, followed by condensation and fractionation of the condensate, is required because methanethiol has a very appreciable solubility in water or in carbonate solution.

Another variation in the recovery of products in the process consists essentially in the use of a scrubbing oil, such as a white oil, for removing products from the effluent gas from the reactor. The oil absorbs products other than hydrogen sulfide, and the unabsorbed hydrogen sulfide can then be passed on to other recovery units for reclamation. However, here again, the principal disadvantages of the operation reside in the facts that substantial volumes of the oil must be used in the recovery operation, and stripping followed by condensation and fractionation is required.

The liquid phase reaction for synthesizing the methanethiol can be carried out in a semi-continuous system by successively withdrawing portions of the liquid from the reactor and adding corresponding amounts of reactants thereto, without replacing the entire catalyst charged initially. The method also can be conducted continuously by virtue of settlers with suitable baffles, circulating catalyst-containing slurry from settlers back to the reactor, and continuously charging sufficient fresh catalyst to maintain a desired level of activity, spent catalyst being continuously withdrawn in corresponding amount.

In this specification, a standard definition of space velocity is followed: the volume of gas entering the reactor per hour reduced to standard temperature and pressure divided by the apparent volume of catalyst in the reactor.

Since certain changes may be made in carrying out the process described without material departure from the scope of the invention, it is intended that all matter contained in the description shall be interpreted as illustrative and not in a limiting sense.

What is claimed is:

1. In the method of making methyl mercaptan comprising contacting carbon disulfide with hydrogen the improvement comprising contacting said carbon disulfide with hydrogen in the presence of a Friedel-Crafts type catalyst.

2. In the method of making methyl mercaptan comprising the reduction of carbon disulfide with hydrogen, the improvement comprising contacting carbon disulfide with hydrogen in the presence of a catalyst selected from the group consisting of chlorides and bromides of metals selected from the group consisting of aluminum, iron, antimony, columbium, cobalt, zirconium, gallium, tin, beryllium, tungsten, tantalum, copper and bismuth, and boron trifluoride and its mixtures and compounds with hydrogen fluoride and phosphorus trifluoride.

3. The method in accordance with claim 2 in which the process is carried out at a temperature in the range from ambient to about 400° C., and a pressure in the range from atmospheric to about 500 pounds per square inch.

4. The method in accordance with claim 3 in which the catalyst is aluminum chloride.

5. The method in accordance with claim 3 in which the catalyst is aluminum bromide.

6. The method in accordance with claim 3 in which the catalyst is zirconium tetrachloride.

7. The method of making methyl mercaptan in accordance with claim 3 in which the reactants are maintained so that there is always a stoichiometric excess of hydrogen and the space velocity is in the range from 50 to 500.

8. The method of making methyl mercaptan and dimethyl sulfide by reacting carbon disulfide with hydrogen in accordance with claim 3 comprising, maintaining the carbon disulfide in the liquid phase by a pressure which substantially keeps the carbon disulfide liquid but permits the methyl mercaptan to volatilize substantially.

9. The method in accordance with claim 8 in which the catalyst is aluminum chloride.

10. The method in accordance with claim 8 in which the catalyst is aluminum bromide.

11. The method in accordance with claim 8 in which the catalyst is zirconium tetrachloride.

12. In the method of making methyl and methylene sulfur compounds comprising the reduction of carbon disulfide with hydrogen the improvement comprising contacting said carbon disulfide with hydrogen in the presence of a Friedel-Crafts type catalyst.

13. In the method of making methyl and methylene sulfur compounds comprising the reduction of carbon disulfide with hydrogen the improvement comprising contacting said carbon disulfide with hydrogen in the presence of a catalyst selected from the group consisting of chlorides and bromides of metals selected from the group consisting of aluminum, iron, antimony, columbium, cobalt, zirconium, gallium, tin, beryllium, tungsten, tantalum, copper and bismuth, and boron trifluoride and its mixtures and compounds with hydrogen fluoride and phosphorus trifluoride.

14. The method in accordance with claim 13 in which the process is carried out at a temperature in the range from ambient to about 400° C., and a pressure in the range from atmospheric to about 500 pounds per square inch.

15. The method in accordance with claim 14 in which the catalyst is aluminum chloride.

16. The method in accordance with claim 14 in which the catalyst is aluminum bromide.

17. The method in accordance with claim 14 in which the catalyst is zirconium tetrachloride.

RICHMOND T. BELL.

REFERENCES CITED

The following references are of record in the file of this patent:

UNITED STATES PATENTS

| Number | Name | Date |
| --- | --- | --- |
| 2,402,613 | Farlow et al. | June 25, 1946 |

OTHER REFERENCES

Fischer et al.: Brennstoff, Chem., vol. 19, pages 245–9 (1938).

Cawley et al.: J. Soc. Chem. Ind., vol. 62, pages 116–119 (1943).